United States Patent [19]

Orain

[11] Patent Number: 4,840,657

[45] Date of Patent: Jun. 20, 1989

[54] PROCESS AND APPARATUS FOR BENDING GLASS PLATES

[75] Inventor: Roger Orain, Garches, France

[73] Assignee: Saint-Gobain Vitrage, Courbevoie, France

[21] Appl. No.: 216,389

[22] Filed: Jul. 8, 1988

[30] Foreign Application Priority Data

Jul. 15, 1987 [FR] France .................. 87 09916

[51] Int. Cl.$^4$ .................................. C03B 23/025
[52] U.S. Cl. ...................... 65/107; 65/106; 65/273; 65/287
[58] Field of Search ........... 65/104, 106, 107, 273, 65/290, 291, 287

[56] References Cited

U.S. PATENT DOCUMENTS

| | | | |
|---|---|---|---|
| 2,886,922 | 5/1959 | Yando, Jr. .................. | 65/107 |
| 3,177,060 | 4/1965 | Pedersen .................... | 65/273 X |
| 3,782,916 | 1/1974 | Powell et al. ............... | 65/104 |
| 4,483,702 | 11/1984 | Frank et al. ............... | 65/104 X |
| 4,501,603 | 2/1985 | Frank et al. ............... | 65/104 X |
| 4,514,208 | 4/1985 | Nitschke ..................... | 65/106 X |

*Primary Examiner*—Arthur Kellogg
*Attorney, Agent, or Firm*—Oblon, Fisher, Spivak, McClelland & Maier

[57] ABSTRACT

Each glass plate, brought to a high temperature, arrives flat on a conveyor by resting there by its lower face, is picked up by its lower face, is turned over to bring its initially lower face into the upper position, and is then placed on a bending form the profile of which it assumes. A device for accomplishing this process has a pivoting plate capable of turning the glass plate over, a bending form, optional pressing means, and a frame for conveying bent glass plates to a succeeding work station.

33 Claims, 3 Drawing Sheets

FIG_1

PROCESS AND APPARATUS FOR BENDING GLASS PLATES

FIELD OF THE INVENTION

This invention relates to bending, optionally followed by tempering, of glass plates.

BACKGROUND OF THE INVENTION

The automobile industry has increasing requirements on the quality of glazings that are supplied to it. In particular, in addition to optical quality and dimensional precision, it requires a very great precision in the curves of the glazings and demands new shapes.

In the bending processes used so far (for example, of the type described in European Pat. No. 3,391), a planar glass plate, arriving on a conveyor after having been brought to a high temperature, is taken by a partial vacuum grasping device acting on the upper face of the glass plate. The glass plate is lifted to allow a bending frame with a curved profile, open in its center and with an upturned concavity, to be brought under it. Then the glass plate is placed or allowed to drop on the bending form, on which it sags under its own weight to take the shape of the bending form.

The profile of the glass plate thus bent then corresponds rather well, on its edges, to the desired profile because the plates sags to rest by its edges on the bending form, but the curve of the plate in its center is hard to control. If the sagging time is too long, and/or if the temperature of the glass is a little too high, an excessive sagging occurs in the center of the glass plate, which results in a profile with too pronounced a curvature in the center. Similarly, if the temperature is too low and/or the sagging time is too short, too little sagging occurs in the center of the glass plate, which results in a profile with too little curvature in the center.

Further, the bending frame can lightly mark the glass and be the cause of a slight flattening on the edge of the glass plate.

Further, some curves are not attainable by processes of this type—in particular, those that are too pronounced near the edge of the glass plate and those that have to assume narrow and/or angular portions of the glass plates.

Further also, the automobile industry with increasing frequency requires glazings carrying enamel deposits, for example, as narrow peripheral strips, particularly to mask the glue which will be used to fasten the glazings and window openings of automobile bodies, as networks covering the entire surface to constitute sunscreens, or as strips or various patterns to serve as decorative elements. These enamel deposits add an additional difficulty to the production of glazings, to their handling, and to their working in general because of the fragility of the enamel and its still liquid or pasty consistency at the beginning of the bending operation.

In the above mentioned bending process, the face of the glass plate which carries the enamel is directed upwardly to avoid damage on the conveyor rollers, and therefore it comes in contact with a grasping device. Accordingly, precautions must be taken to avoid marking the glass plates with enamel coming from previously treated glass plates, which enamel will have fouled the grasping device.

OBJECT OF THE INVENTION

This invention aims at avoiding the drawbacks and inadequacies of techniques of the prior art, particularly the lack of precision and the curvature at the center of glazings, the difficulty in achieving certain shapes, the presence of marks and flattenings of the edges of the glazings, and the difficulty in treating glass plates carrying enamel deposits.

GENERAL DISCUSSION OF THE INVENTION

In one aspect, the invention comprises a process for bending glass plates in which each glass plate, brought to a high temperature, arrives flat on a conveyor by resting there on its lower face, is picked up by its lower face, turned over to bring its initially lower face into the upper position, and is then placed on a bending form the profile of which it assumes.

Advantageously, the bending form is upwardly convex.

In some cases, the glass plates assume the profile of the bending form under the sole effect of gravity. In other cases, a pressing comes to aid the glass plates to assume the profile of the bending form.

In some cases, the bent glass plates are evacuated to the following work station by being placed on the bending form itself. In other cases, after pressing with a counterform, the counterform is removed by lifting with it the glass plate to permit the entry under it of a special output frame which then receives the bent glass plate, evacuates it from the bending station, and transfers it to the following station, which may be a tempering or an annealing station.

In another aspect, the invention comprises a bending device having a plate equipped with conveyor means that are retractable or able to be put out of operation and that is able to receive the glass plates following the conveyor that brings them. The bending device is also equipped with means for holding the glass plates by partial vacuum and is able to pivot the conveyor means to turn over the held glass plates to bring the initially lower faces of the plates into the upper position. The bending device also has a bending form, placed under the plate after it has pivoted so that, when the glass plate leaves the plate, the glass plate is deposited on the bending form.

Advantageously, the bending form is upwardly convex.

According to some embodiments, the device according to the invention also has means for pressing the glass plates against the convex bending form. These means may be pneumatic pressing means or mechanical pressing means such as a counterform.

In an embodiment where the conveyor means have rollers, the plate of the device according to the invention exhibits a surface in which parallel grooves are made. The parallel grooves house the rollers of the conveyor means associated with the plate and carried by it when they are in their retracted positions. The surface portions of the plate between the grooves are pierced with holes through which, depending on the bending phases, partial vacuum or excess pressure is applied.

Advantageously, in the embodiment where the conveyor means comprise rollers, the device according to the invention is equipped with means for locking in their retracted position the rollers of the conveyor means associated with the pivoting plate.

In another embodiment, the conveyor means comprise a gas cushion.

BRIEF DESCRIPTION OF THE DRAWINGS

The invention will now be described in greater detail with reference to the accompanying figures.

DETAILED DESCRIPTION OF THE PRESENTLY PREFERRED EMBODIMENTS

Figure 1:
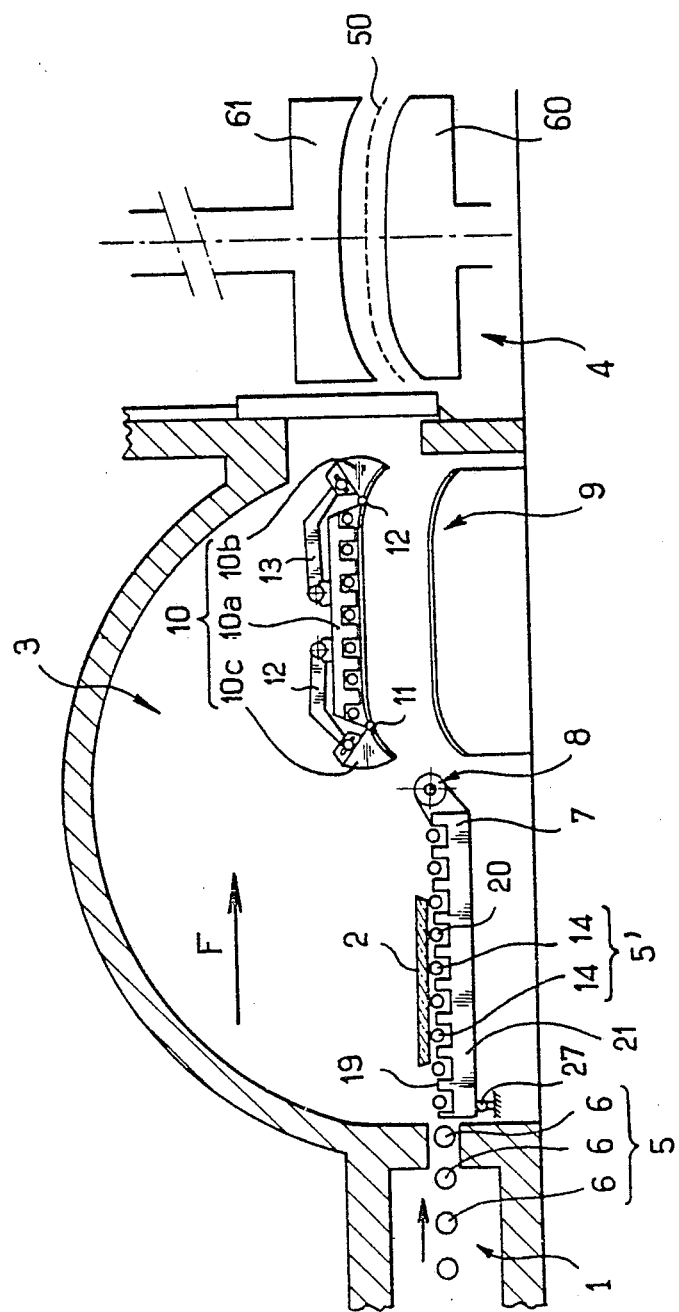
FIG. 1 is an overall view of a bending installation according to the invention followed by a tempering station.

FIG. 1 shows an overall view of an installation for bending and tempering or annealing of glass plates. It shows a furnace 1 for heating glass plates 2 to be bent, a bending cell 3, and a tempering or annealing station 4. The furnace 1 is passed through by a conveyor 5 (composed, for example, of rollers 6 or a gas cushion conveyor) which is extended into the bending cell 3, at the same level, by a portion 5' carried by a plate 7. The plate 7 has an initially upper surface 19 and is pivoted around a pivoting pin or shaft 8. The bending cell 3 also contains a bending form 9, which is upwardly convex, and it optionally contains means 10 for pressing the glass plates 2 on the bending form 9.

The bending form 9 can be a solid form or a ring with a convex curved profile able to support the glass plates 2 only on their peripheries (such a ring is also called a "bending frame"). Optionally on such a ring, complementary crosswise or longitudinal bars, matching the final profile desired for the glass plates, can be provided. The bending form 9 can further be pierced with orifices through which a partial vacuum or a positive pressure can be exerted to facilitate placing the glass plates against it.

According to a variant, the orifices in the bending form 9 through which a partial vacuum is applied are replaced or complemented by a peripheral skirt as described in French Pat. No. 2,085,464 (the disclosure of which is hereby incorporated herein by reference), and the partial vacuum is exerted through the space separating the peripheral skirt from the bending form 9. (The obtaining of a partial vacuum at the periphery of the bending form 9 in this manner is applicable only in the case of a solid bending form 9).

The pressing means 10 can be pneumatic means—i.e., they make consist of a hot gas current directed vertically downwardly against a glass plate placed on the bending form 9. The gas current can be produced, as described in published European Patent Application No. 85/401,345.5 (published under No. 0,106,758) (the disclosure of which is hereby incorporated herein by reference), by a cross-flow fan blowing in an enclosure the lower closing wall of which, opposite the glass plate against which the glass flow is to be directed, exhibits a great number of gas outlet orifices, the distance between the lower closing wall and the glass plate being such that the gas jets join and overlap to form a homogeneous flow field at the level of the glass plate. Advantageously, a system for recycling the blown gas and input of heat is provided. Such pneumatic pressing means are not represented in the figures.

The pressing means 10 can also be mechanical means. Such means are diagrammatically represented in FIG. 1, consisting of a counterform with a concavity turned downwardly, complementary to the upwardly convex bending form 9.

The pressing means 10 can be a counterform in a single piece or a counterform in several pieces (for example, 10a, 10b, and 10c—lateral parts 10b and 10c being connected around joints 11b and 11c belonging to the central part 10a) to allow their lifting by cylinders (not shown) acting on arms 13 and 12. Making the counterform in several pieces facilitates the approach and removal of the counterform without friction on the glass, particularly when a very pronounced curvature is to be given to the glass plates near their edges.

The mechanical pressing means 10 are equipped with orifices (not shown in the figures) able to create, on their lower concave face coming in contact with the glass sheets, a partial vacuum in certain phases of the bending process and a pressure during other phases. For this purpose, they are connected by cavities and ducts (not shown) to sources of vacuum and/or gas under pressure. To permit the partial vacuum, instead of orifices through the surface, or as a complement to the orifices, the mechanical pressing means 10 (particularly when they are of one piece) can be equipped with a peripheral skirt as described in French Pat. No. 2,085,464, and the partial vacuum is then exerted at the periphery of the counterform through the space between the counterform and its associated skirt.

The effect of the partial vacuum at the level of the counterform can be complemented by the pressure effect exerted by blowing through the bending form 9.

Depending on the curvature to be given to the glass plates, the counterform can be solid or it can consist of discontinuous support elements which are perpendicular to the support zones of the bending form 9 when the bending form 9 consist of a frame open in its center. Optionally, crosswise or longitudinal complementary bars (not shown in the figures), equipped with insulating material, can be provided.

The plate 7, as already mentioned, is located on the inside of the bending cell 3 and carries a conveyor portion 5' which is an extension of the conveyor 5 which carries the glass plates 2 through the furnace 1 and brings them to the bending cell 3.

Figure 2:
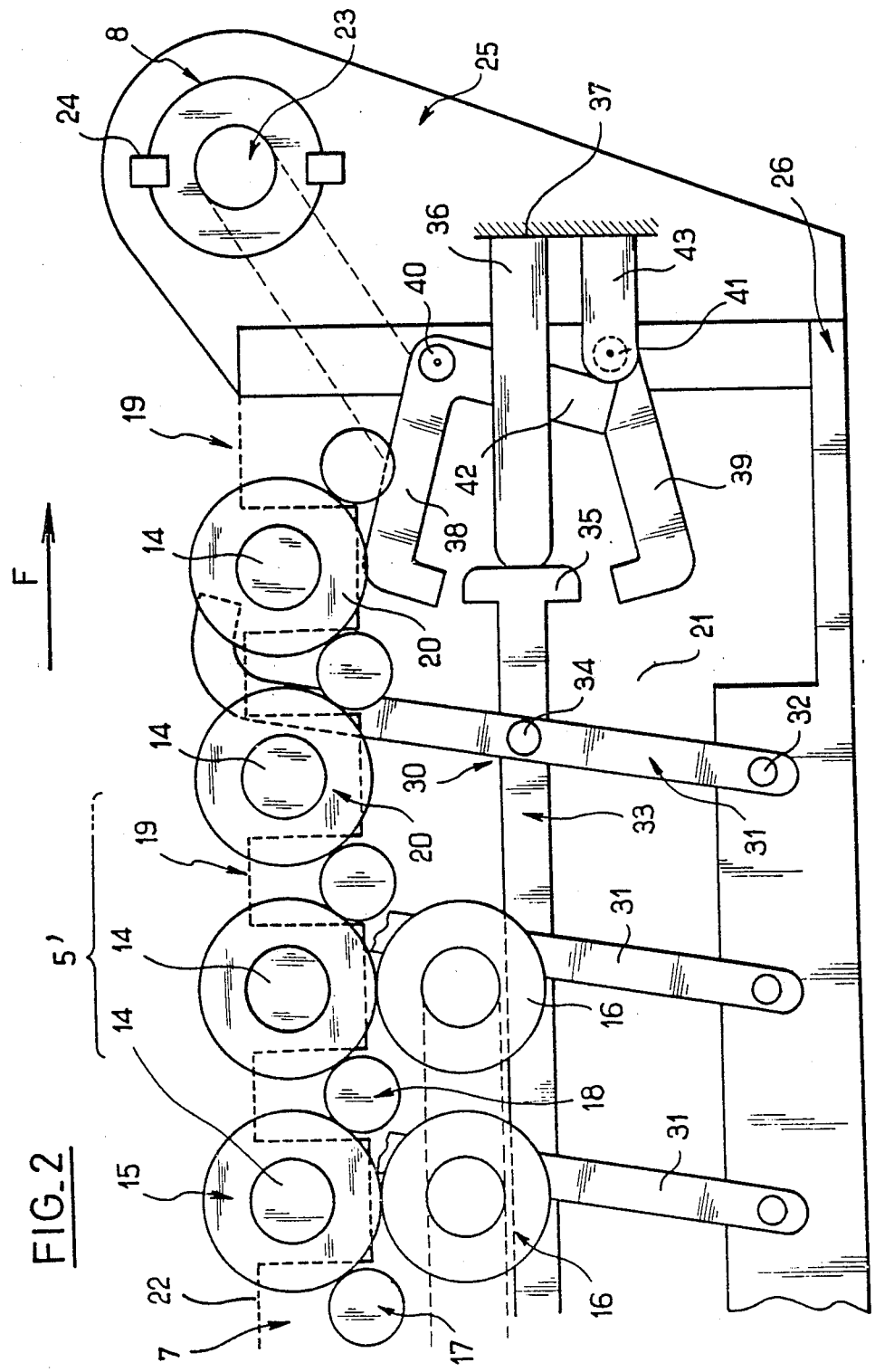
FIG. 2 is a detailed view of the pivoting plate of the bending installation showing the structure of the pivoting plate, the rollers of the associated conveyor part, and means for locking the rollers in their retracted position.

The conveying function of the portion 5' carried by the plate 7 is assured, for example, by rollers 14 which can be covered with sheaths (not shown) of glass or silica fibers. On each end of each roller 14 is keyed a support roller 15 (shown in FIG. 1 but more easily seen in FIG. 2) which rest on a drive roller 16. The drive rollers 16 are driven in rotation by a standard kinematic unit (not shown), which, considering the high temperature prevailing in the bending cell 3, is advantageously placed outside the bending cell 3. Each support roller 15 also rests on two idle centering rollers 17 and 18. (As shown, the downstream idle centering roller 18 for one roller 14 is preferably identical to the upstream idle centering roller 17 for the adjacent downstream roller 14.)

The kinematic unit which acts on the drive roller 16 located at each end of the rollers 14 and which also carries the idle centering rollers 17 and 18 comprises two identical parts located on each edge of the bending cell 3. These two parts are carried by a structure (not shown) passing under the bending cell 3.

The conveyor portion 5' is mounted to be retractable in the sense that it is movable between a first position in which it is in the extension of the conveyor 5 going through the furnace 1 and at the same level to receive each new glass plate 2 and a second position in which it is lowered, allowing each glass plate to rest on the initially upper surface 19 of the plate 7.

For this retraction of the portion 5' of the roller conveyor, the initially upper surface 19 of the plate 7 is hollowed with grooves 19 which constitute housings for the rollers 14 when they are in their lower retracted position.

In their active position, the rollers 14 are at a level such that their upper generatrix is located above the initially upper surface 19 of the plate 7 (for example, 5 mm above). When in their retracted position, the upper generatrix of the rollers 14 is located at a level lower than that of the initially upper surface 19, thus allowing the glass plates 2 to rest only on the initially upper surface 19.

During retraction of the rollers 14, the drive roller 16 are also retracted. The drive rollers 16 are retracted by a height greater than that by which the rollers 14 are retracted, which stops the rotation of the rollers 14.

To do this, the structure that carries the kinematic unit comprising the drive rollers 16 and the idle centering rollers 17 and 18 can adopt two levels: a high level which is that in which the portion 5' is in the extension of conveyor 5 and a low level which is that in which the rollers 14 of the portion 5' are retracted and in which a glass plate placed initially on the rollers 14 is supported on the initially upper surface 19. To make possible the stopping of the driving of the rollers 14, the depth of the grooves 20 is less than the distance between the high and low levels which the structure can adopt, so that the lowering of the drive rollers 16 is greater than that of the rollers 14.

In other embodiments, the conveying function of the portion 5' and optionally also of the conveyor 5 is assured by a gas cushion associated with a means for driving of the glass plates on the gas cushion. For example, the gas cushion can be slightly inclined laterally (e.g., by about 5°), and the means for driving the glass plates can comprise a chain equipped with pins for pushing the glass plates. The chain is placed laterally relative to the gas cushion, on the bottom side, and it moves in the direction provided for the movement of the glass plates. The plates 7 then contains blowing means (not shown) to permit sustaining of the glass plates. During certain phases of the process, the blowing means are out of operation, and the glass plates then rest on the initially upper surface 19 of the plate 7.

Regardless of the embodiment, the plate 7 further comprises one or more boxes 21 emptying through the initially upper surface 19 of the plate 7 by orifices 22. The boxes 21 are connected to a suction and/or pressurizing system (not shown).

Pressurized gas, generally air, is supplied hot to the boxes 21 to avoid cooling the glass plates 2 brought to high temperature for their bending and optionally their later tempering. In the case of the embodiment with a gas cushion conveyor, the blowing means serving to constitute the gas cushion can be merged with those of the pressurizing system, optionally with differently adjustable flows and/or pressures.

Advantageously, the initially upper surface 19 of the plate 7 is provided with a suitable insulating refractory covering.

The plate 7 is mounted to pivot around the pivoting pin or shaft 8, and through the shaft 8 a duct 23 (shown in FIG. 2) is placed. The partial vacuum or excess pressure is routed through the duct 23 to the feed boxes 21 of the plates 7. Additionally, the pressurized gas for the gas cushions in the case of the embodiment with a gas cushion conveyor is also routed through the duct 23.

Advantageously, the pivoting shaft 8 is mounted parallel to the direction of the rollers 14. It is solidly keyed in bores 24 made in lateral parts 25 of a part 26 constituting the base of the boxes 21 and of the plates 7. The shaft 8 is guided in bearings (not shown) located on both sides and outside of the bending cell 3. At the end of the shaft 8 on one side is applied a drive system (not shown) comprising a reduction gear coupled to a DC motor, controlled by an electronic system assuring precise kinematics of the pivoting with an acceleration ramp, a bearing phase, and a deceleration ramp. Touching stops 27 are provided to obtain rigorous positioning at the end of the pivoting cycles of the plate 7.

As indicated above, in the case of the roller conveyor embodiment, the rollers 14 of the conveyor portion 5' are totally free when they are retracted. Also, it is necessary to assure their holding during pivoting of the plate 7. The locking system resorts to a simple mechanism using gravity and link pins with sufficient play to guarantee good function when hot. The locking system comprises two identical subassemblies 30 placed symmetrically inside the bending cell 3, one on each side of the pivoting plate 7. Each subassembly 30 is made up as described below. Each roller 14 is associated at each of its ends with a holding stop 31 that is at least approximately cross-shaped at the high end. Each holding stop 31 is able to cover, by its part curved in a cross, the end of the associated roller 14 when it is in its retracted rest position, resting on the bottom of the associated groove 20 in the plate 7. The base of each holding stop 31, opposite its curved part, is linked to a stationary pin 32 placed laterally on the part 26 of the boxes 21 and of the pivoting plate 7.

A locking connecting rod 33 connects together all the holding stops 31 associated with the ends of the rollers 14 placed on the same side. The locking connecting rod 33 is linked to a joint 34 on each holding stop 31. The joints 34 are located at a distance from the stationary pins 32 that is at least approximately at midlength of each holding stop 31.

The joints 34 are inclined toward the front, so that the holding stops 31 are constantly inclined and the weight of their cross-shaped heads under the effect of gravity has a tendency to make them incline still more.

The locking connecting rod 33 ends on the downstream or front side in a locking head 35. (Downstream is determined by the direction of advance of the gas plates in the installation, a direction marked by an arrow F in the figures.)

An unlocking pin 36, mounted stationarily on a frame 37 in the bending cell 3, is provided to work with the locking head 35 and to keep it shoved upstream when the pivoting plate 7 is in its horizontal position ready to receive, on the conveyor portion 5' which it carries, a new glass plate 2 coming from the furnace 1. An upper latch 38 and a lower latch 39 pivot around pins 40 and 41, respectively. The pins 40 and 41 are mounted on the part 26 of the plate 27. The latches 38 and 39 have curved free ends, opposite their pivoting points, which engage the locking head 35 and thus prevent it from recoiling. The upper latch 38 is provided with a lug 42 which is sized, shaped, and positioned to rest on a stop 43 mounted on the frame 37 of the bending cell 3.

In the case of the embodiment with a gas cushion conveyor, putting the gas cushion out of operation is simple, since it is done by cutting off the flow of gas feeding the gas cushion.

During pivoting of the plate 7 equipped with a gas cushion conveyor portion 5', there is therefore nothing to monitor. To facilitate the pivoting, the lateral means for driving of the glass plates, associated with a gas cushion, are advantageously independent of the pivoting plate.

The installation is also equipped with means for positioning and centering of the glass plates to be worked on the conveyor portion 5' carried by the plate 7. Such means are described, for example, in French Patent Application Nos. 86/15,488 and 85/13,801 (published under No. 2,587,478) (the disclosure of which is hereby incorporated herein by reference).

Figure 3:
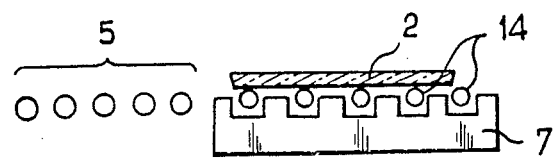
FIG. 3 is a diagram illustrating the different phases of the bending process.
Figure 3:
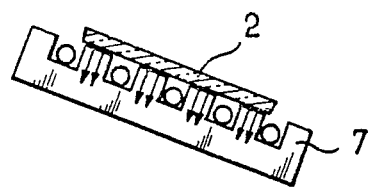
Figure 3:
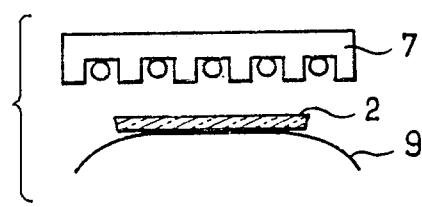
Figure 3:
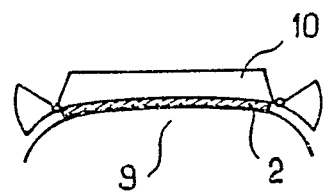
Figure 3:
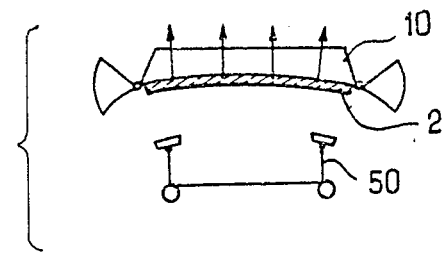
Figure 3:
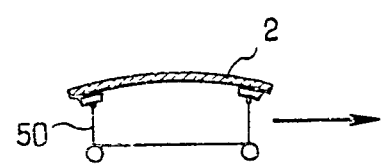

The installation can further comprise a frame 50 (shown in FIG. 3) for conveying bent glass plates. The frame 50 is adapted to take the glass plates 2 from the bending cell 3 to transfer them into the tempering or annealing station 4.

However, when the bending form 9 is a frame open in its center, the frame 50 can be made mobile, which permits the entire assembly to be transferred to the tempering or annealing station 4.

Of course, to promote a high rate of production of tempered or annealed bent glazings, it is preferable that the bending form 9 remain in place in the bending cell 3, after discharge of a bent glass plate 2 to the next station 4, so as to able to receive the following glass plate 2 immediately. In this case, it is preferable therefore to provide at least one frame 50 especially intended for the discharge of glass plates and for supporting the plates during their tempering or their annealing, or a replacement of the bending form 9, which would have left with the bent glass plate, with another concave form provided in waiting in the bending cell 3 itself, or in a neighboring enclosure, either hot or cold, depending on the nature of the materials constituting the bending form.

Of course, as is standard in the art, the bending cell 3 is kept at a high temperature, and the outlet (or, optionally, multiple outlets) provided to the tempering or annealing station(s) 4 is (are) equipped with retractable insulating closings of a guillotine door type.

Possibly the pressing means 10 is mounted to be able to be driven in the movements necessary for its use. The pressing means 10 can thus be driven in a vertical movement either to come close to the bending form 9 and to press a glass plate or to move away from it. This vertical movement can have a large amplitude to permit the arrival and leaving of glass plates 2 as well as pivoting of the plate 7. On the other hand, the vertical movement can have a small amplitude intended for the final approach relative to the glass plate, the complete disengagement to allow the arrival or evacuation of glass plates as well as the pivoting of the plate 7 taking place in another direction (for example, the horizontal direction).

In the case of only vertical movements, the pressing means 10 is fastened to a plate (not shown) at the end of a vertical column (also not shown). The vertical column slides vertically over considerable distance necessary for complete disengagement for the movement of the glass plates 2 and the plate 7.

In the case of horizontal movements, the pressing means 10 is mounted on a plate (not shown) at the end of a horizontal beam (also not shown). The position of the horizontal beam can be crosswise relative to the longitudinal axis of the installation marked by the arrow F. The horizontal beam slides (for example, in a guide system which can be installed outside the bending cell 3) to allow stationing of the pressing means 10 outside the bending cell 3, outside the hot atmosphere. In this case, the orifice for introduction of the pressing means 10 into the bending cell 3 is blocked by a sufficiently insulating door (for example, of a guillotine type).

Sliding of the beam in the guide system is obtained by a motor with precise control (for example, a DC gear motor with an acceleration ramp, a deceleration ramp, and a bearing phase) assuring rapid displacements and rigorous positionings.

The entire unit is fastened to a platform (not shown) able to place it in high position far from the bending form 9 or in an exact low position, with passages from one to the other of the positions in fast approach speed, then in slow touching speed—particularly downwardly, since this movement will assure pressing of the glass plates. The clearance between the high and low positions is sufficient to allow the entry and exit of the optional special conveyor frame 50 or of the bending frame 9 itself.

Adjustable stops which are not all represented in the figures are advantageously provided to guarantee precise positionings.

Feeding of gas under pressure and/or partial vacuum is advantageously performed either through the column in the case of a solely vertical movement of through the beam in the case of horizontal movement.

The tempering or annealing station 4 following the bending cell 3 is a standard station. In case of a tempering station, as usual, a lower blowing means 60 and an upper blowing means 61 are provided between which the glass plates 2 to be tempered are placed, the plates resting on a support frame, a special frame 50, or a bending form 9.

The installation has been described with a single bending station and a single tempering or annealing station 4. However, a single plate 7 can feed several bending stations or a single bending station or several bending stations can feed several special frames 50 intended to feed and turn several tempering or annealing stations. A train of special frames successively introduced between the bending form 9 and the pressing means 10 are then provided.

The installation described above functions as described below.

The glass plates 2, optionally carrying enamel patterns on their upper face, go one by one on the conveyor 5 through the furnace 1, in which they are brought to shaping temperature. At the exit of the furnace 1, the glass plates 2 go into the bending cell 3, which is kept at a high temperature, and are taken over by the conveyor portion 5' on the plate 7. The plate 7 pivots around the pin 8, which is, for example, parallel to the direction of the conveyor rollers 6 or perpendicular to the direction of passing of the glass plates. The progress of the glass plates 2 on the conveyor 5' is performed at the same speed as through furnace 1 (FIG. 3A).

After positioning, recentering, and stopping of a glass plate 2 on the conveyor portion 5', in the case of a roller conveyor, the rollers 14 of the portion 5' are retracted by passages at the low level of the structure which carries the kinematic unit acting on the drive roller 16 and the centering rollers 17 and 18 for the rollers 14. A glass plate 2 initially carried by the rollers 14 is then supported on the initially upper surface 19 of the plate 7, and the rollers 14 are in their rest or retracted position, at the bottom of the grooves 20, at stopping and are then separated from the drive roller 16. In the case of a gas cushion conveyor, once each glass plate 2 has been positioned correctly, the gas cushion is interrupted, and the glass plate 2 then rests on the initially upper surface 19 of the plate 7.

The glass plate 2 is immobilized by activating the partial vacuum through the orifices 22 in the initially upper surface 19.

The plate 7 then begins pivoting around the pivoting shaft 8 (FIG. 3B). In the case of a roller conveyor portion 5', the operations are linked as indicated below.

The upper latch 38 then has its lug 42 leave the stop 43, gravity carrying the head of the upper latch 38 downwardly. The curved free end of the head of the upper latch 38 therefore engages behind the locking head 35 terminating the locking connecting rod 33 as soon as the plate 7 has pivoted sufficiently and the locking connecting rod 33, freed from its stop against the locking pin 36, has been pushed sufficiently forwardly under the effect of gravity acting on the unit of holding stops 31. The holding stops 31, subjected to gravity, are inclined a little more forwardly as the plate 7 pivots, thus locking by their cross-shaped ends the rollers 14 in their rest positions at the bottom of the grooves 20. The plate 7 continues its pivoting. When it has pivoted a little more than 90°, the lower latch 39, subjected to the effect of gravity, engages it curved head behind the locking head 35. A few degrees later, the upper latch 38, on which the effect of gravity is slightly reduced by the effect in the opposite direction of gravity on its lug 41, unlocks the locking head 35. Further, approximately at mid course of the plate 7 in its pivoting, gravity acts directly and favorably on the holding stops 31. During the entire sequence of pivoting to 180°, it is therefore the lower latch 39 which locks the entire mechanical unit so that the rollers 14 remain locked at the bottom of the grooves 20.

In case the conveyor part 5' carried by the plate 7 is a gas cushion conveyor, after cutting off the gas cushion and holding the glass plate by a partial vacuum, the plate 7 pivots.

At the end of the pivoting, the electronic system associated with the drive system of the plate 7 orders a slowing of the pivoting, then its stopping. The plate 7 touches a stop when it is exactly above the bending form 9 (FIG. 3C).

The partial vacuum through the orifices 22 of the initially upper surface 19 (which is now the lower surface) of the plate 7 is then interrupted, and advantageously a slight excess pressure is sent through the orifices 22 (or through orifices identical with the orifices 22 but separate therefrom). The glass plate 2 is thus placed on the bending from 9 (FIG. 3C).

The plate 7 is then sent back to its initial position to wait for the next glass plate 2. In the case of the roller conveyor 5', during the entire pivoting in the opposite direction, the latches (first the lower latch 39 and then the upper latch 38) lock the locking head 35 of the locking connecting rod 33 (except, perhaps, during a short moment when the plate 7 is close to its mid course, but at that moment gravity acts directly on the holding stops 31 and on the locking connecting rod 33, so that in any case rollers 14 stay locked at the bottom of the grooves 20). Slightly beyond mid course, the lower latch 39 is unlocked solely under the effect of gravity, so that only the upper latch 38 remains locked. At the end of the pivoting of the plate 7 in its return travel, the lug 42 of the upper latch 38 strikes against the stop 43, which has the effect, with the pivoting continuing, of unlocking the locking head 35.

Immediately afterwards, the locking head 35 encounters the unlocking pin 36, which, as the pivoting continues, causes the thrusting of the locking connecting rod 33 and the withdrawal of the holding stops 31, so that the rollers 14 are released. The plate 7 then stops on the touching stop 27. The rollers 14 are brought up into the active position by passage at the high level of the structure which carries the kinematic unit acting on the direct roller 16 and the centering roller 17 and 18 of the rollers 14.

During this time, the glass plates 2 placed on the bending form 9 was able by the simple effect of gravity to sag on the bending form 9 and to assume its profile. Optionally, a partial vacuum through or on the periphery of the bending form 9 helped with the sagging.

The bending form 9 carrying the bent glass plate 2 then leaves the bending cell 3 and is transferred to the following tempering or annealing station 4. If a tempering station is involved, the bending form is advantageously a frame open in its center to promote the passage of tempering air.

For certain profiles to be obtained, the simple sagging, optionally helped with a partial vacuum, is insufficient. In this case, supplementary pressing means are used. If pneumatic means are involved, after action of these means, the bending form 9, as in the proceeding case, is transferred at the same time as the bent glass plate to the next work station. If mechanical pressing means are involved, a counterform is brought into contact with the glass plate placed on the bending form 9 and forces it to assume the profile of the bending form 9 (FIG. 3D).

The counterform is then lifted. Depending on the case:

(a) the counterform is removed alone, leaving the bent glass plate 2 on the bending form 9, and the bending form 9 is taken from the bending cell 3 and transferred to the next tempering or annealing station; or (b) the counterform is removed, taking with it the glass plate. To do this, a partial vacuum is exerted through the counterform 10 (FIG. 3E) and/or on its periphery. This partial vacuum through the counterform can be helped by a positive pressure through the bending form 9.

The counterform and the glass plate 2 are lifted enough to permit the entry of the special conveyor frame 50 on which the glass plate 2 is placed, and the special frame 50 takes the bent glass plate 2 from the bending cell 3 and transfers it to the next tempering or annealing station 4 (FIG. 3F). At the moment of release of the glass plate 2 by the counterform, a slight excess pressure can advantageously be applied.

Winding of the glass plate to be bent on a convex form is preferable to sagging on a concave form. Control of the bending in the center of the glass plate, which is one of the sensitive points when a concave bending frame is used, is obtained much more accurately in the case of a convex form. A certain arch effect is produced which causes no excessive curvature in the center even in case of excessive temperature of the glass or in case of too long a sag time, particularly during transfer to the following work station.

Further, in case of use of the special conveyor frame 50, even if a slight unwanted sag appears during transfer to the following work station, it is then possible to provide a convex bending form 9, not having exactly the final profile desired for the glazing, but a profile corrected to compensate for the unwanted sag in advance.

Therefore, thanks to the invention it becomes possible to meet the requirements of automobile makers who demand bent glazings having a zero double bending —i.e., an excess bending in the center which is zero.

The invention also makes it possible to produce bent glazings for which the bending tolerances are much closer than by resorting to techniques of the prior art.

Further, the invention is also very advantageous for production of bent curved glazings enameled on their concave face. The glass plates then arrive in the bending installation with, on their upper face, a coating that is still fragile, or even almost liquid, and this enamel coating is preserved from any contact with an element of the installation at the beginning of the bending process, which is sufficient to allow it to solidify and become resistant. This is because the glass plate, which has its coating on the upper face, is turned over while being held only by the partial vacuum exerted on its lower face.

Then, the contact of the enamel against the bending frame 9 can be made without damage, since the enamel has had time to solidify. Also, even in certain variants of the process, the convex bending form 9 being a frame, it is possible to ensure that the glass plate does not rest on the frame, by resting only its enamel-free portions there. For this purpose, it suffices to provide the position of a support zones of the frame in the zones of the glazings that are free of enamel.

Thanks to the use of a gas cushion conveyor 5′, it is possible, without damage, to treat glass plates enameled on their lower faces. Their lower faces, preserved from any contact, keep intact the enamel that they carry. Then, the lower faces will become the convex faces after bending.

At the end of bending, the enamel on the upper convex face can come in contact with a counterform without being damaged, since it will have had time to harden. Further, the use of a counterform is not indispensable, since either the simple sagging suffices in some cases or recourse is had to pneumatic pressing in other cases.

Further, a glass plate treated in such a bending installation with a gas cushion can comprise enamel coatings on both its faces, both being able to remain intact.

Therefore, it is found that this process allows bending of glasses enameled on one end or the other face.

Of course, a system for turning over the glass plates as described above can also be used to transfer glass plates from one roller conveyor to another, particularly a gas cushion conveyor, or to a device other than a convex form. In particular, the device can have a concave form instead of a convex form. In the same way, glass plates brought on a conveyor, with rollers or the like and particularly with gas cushion, and particularly if it desired not to degrade the enamel deposited on on the lower face of the glass plates, can be transferred onto a convex bending form, without it being necessary to turn the glass plates over. To transfer them, it is possible to use a grasping device of the type described in French Pat. No. 2,085,464 (the disclosure of which is hereby incorporated herein by reference) or in European Pat. No. 3,391 (the disclosure of which is hereby incorporated herein by reference).

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A process for bending glass plates brought to high temperature and arriving flat on a conveyor, said process comprising the steps of:
   (a) grasping each glass plate by its lower face; then
   (b) turning each plate over to bring its lower face into upper position; and then
   (c) depositing each plate on a bending form the profile of which it assumes.

2. A process according to claim 1 wherein the bending form is upwardly convex.

3. A process according to claim 1 wherein each glass plate assumes the profile of the bending form due to sagging under the effect of gravity.

4. A process according to claim 3 wherein sagging under the effect of gravity is helped by a partial vacuum exerted through the bending form and/or on its periphery.

5. A process according to claim 1 wherein each glass plate assumes the profile of the bending form due to mechanical pressing by an upper counterform.

6. A process according to claim 5 wherein, after mechanical pressing of each glass plate by a counterform, the counterform is removed from the bending form by lifting the glass plate by a partial vacuum to allow the introduction under the glass plate of a frame designed for removal of the bent glass plate.

7. A process according to claim 6 wherein the partial vacuum is exerted through the counterform and/or on its periphery.

8. A process according to claim 7 wherein the partial vacuum is complemented by pressure exerted through the bending form.

9. A process according to claim 6 wherein the partial vacuum is complemented by pressure exerted through the bending form.

10. A process according to claim 1 wherein each glass plate assumes the profile of the bending form due to pneumatic pressing by a descending hot air current.

11. A process according to claim 1 wherein, at the end of the bending, each glass plate is transferred to a following work station by transfer to the following work station of the bending form carrying the bent glass plate.

12. A process according to claim 1 wherein, at the end of the bending, each glass plate is transferred to a following work station by transfer of the bent glass plate from the bending form onto a frame designed for transport and removal of the frame designed for transport loaded with the bent glass plate to the following work station.

13. A process according to claim 12 wherein the profile of the bending form differs from the profile to be given to the glass plates to compensate in advance for the unwanted sagging of the glass plates on the frame designed for transport.

14. A process according to claim 1 wherein each glass plate is turned over by a pivoting plate on which it is received after having been brought to high temperature for its bending, the pivoting plate holding the glass plate thanks to a partial vacuum acting on its initially lower face.

15. A process according to claim 14 wherein an excess pressure is applied through the pivoting plate at the moment when each glass plate is separated from the pivoting plate.

16. A process according to claim 1 wherein the turning over of each glass plate is performed around an axis perpendicular to the direction of arrival of the glass plate on the conveyor.

17. A process according to claim 1 wherein the bending form is a ring with a curved profile.

18. A process according to claim 1 wherein the bending form is a solid form.

19. A process according to claim 1 wherein each glass plate has an enamel deposit on one face.

20. Apparatus for bending glass plates brought to high temperature and arriving flat on a conveyor, said apparatus comprising:
 (a) a bending cell;
 (b) a plate located in said bending cell and able to receive the glass plates from the conveyor that brings them, said plate being equipped with means for holding the glass plates by a partial vacuum and being able to pivot to turn over the held glass plates to bring the initially lower faces of these plates into the upper position; and
 (c) a bending form located under said plate after it has pivoted so that, when said plate releases each glass plate, the glass plate is deposited on said bending form.

21. Apparatus according to claim 20 wherein said bending form is upwardly convex.

22. Apparatus according to claim 20 and further comprising means for pressing the glass plates on said bending form.

23. Apparatus according to claim 22 wherein said means comprise pneumatic pressing means emitting a vertical hot gas flow directed downwardly.

24. Apparatus according to claim 22 wherein said means comprise mechanical pressing means comprising a counterform with a profile complementary to that of said bending form.

25. Apparatus according to claim 24 wherein said counterform comprises a central part to which are linked lateral parts able to be retracted to allow the approach and/or withdrawal of said counterform relative to said bending form.

26. Apparatus according to claim 24 wherein said counterform is pierced with orifices through which it is possible to exert a partial vacuum or excess pressure.

27. Apparatus according to claim 24 wherein said counterform is equipped with a peripheral skirt.

28. Apparatus according to claim 20 wherein:
 (a) said plate has an initially upper surface in which parallel grooves are made, said grooves housing rollers belonging to a conveyor means when said rollers are in a retracted position, and
 (b) the portions of the initially upper surface of said plate between said grooves are pierced with orifices through which, depending on the phases of the bending, a partial vacuum or an excess pressure is applied.

29. Apparatus according to claim 28 and further comprising means for locking said rollers in their retracted position at the bottom of said grooves when said plate pivots.

30. Apparatus according to claim 29 wherein said locking means comprise:
 (a) a plurality of holding stops having crossshaped curved ends which engage above each roller under the effect of gravity, said holding stops being mounted upright, being inclined toward the roller to be locked, and being linked by their ends opposite to the cross to a stationary pin;
 (b) a locking connecting rod which connects said holding stops to each other, said locking connecting rod being linked to said holding stops at least approximately in the middle of their lengths, said locking connecting rod being thrust against a stationary unlocking pin to retain said holding stops in a nonactive position when said plate is in position for receiving a glass plate, said locking connecting rod leaving said unlocking pin when said plate pivots, thus causing said holding stops under the effect of gravity to lock said rollers; and
 (c) locking latches retaining said locking connecting rod in an advanced position corresponding to locking during pivoting of said plate regardless of the effect of gravity on said holding stops.

31. Apparatus according to claim 20 and further comprising a special conveyor frame designed to receive glass plates after bending to transfer them to a succeeding work station, said special conveyor frame being a ring with a curved profile.

32. Apparatus according to claim 31 wherein said special conveyor frame is equipped with complementary crosswise or longitudinal bars.

33. Apparatus according to claim 20 wherein said bending form is equipped with means able to create either a partial vacuum or a positive pressure.

* * * * *